United States Patent [19]

Nakagawa et al.

[11] 4,218,121
[45] Aug. 19, 1980

[54] AUTOMATIC APERTURE DRIVING MECHANISM

[75] Inventors: Yasutsugu Nakagawa, Hamura; Michio Yagi, Hachioji, both of Japan

[73] Assignee: Konishiroku Photo Industry Co., Ltd., Tokyo, Japan

[21] Appl. No.: 963,530

[22] Filed: Nov. 24, 1978

[30] Foreign Application Priority Data

Nov. 29, 1977 [JP] Japan .............................. 52/142257

[51] Int. Cl.² ............................................... G03B 9/02
[52] U.S. Cl. ................................................. 354/271
[58] Field of Search ................. 354/40, 43, 44, 270, 354/271, 272

[56] References Cited

U.S. PATENT DOCUMENTS

| | | | |
|---|---|---|---|
| 3,133,488 | 5/1964 | Fritz | 354/271 |
| 3,909,833 | 9/1975 | Sorimachi et al. | 354/271 |
| 4,099,188 | 7/1978 | Uno et al. | 354/271 X |

Primary Examiner—L. T. Hix
Assistant Examiner—Thomas H. Tarcza
Attorney, Agent, or Firm—James E. Nilles

[57] ABSTRACT

An automatic aperture driving mechanism for a camera, comprising an aperture control ring, a regulating means adapted to regulate the aperture control ring in the aperture closing direction, a reset driving means engaging the aperture control ring and a motor, an aperture ring, and an aperture driving lever operatively connected to the aperture ring and adapted to be moved together with the aperture controlling ring. The reset driving means has a gear train including gears having non-toothed portions so that the power transmitting connection of the gear train may be broken. The regulating means includes a pawl adapted to directly engage the aperture control ring so as to hold the latter in the aperture opening position, a ratchet wheel shunting from the gear train, and a regulating pawl engageable with the ratchet wheel and adapted to regulate the condition of the aperture upon engagement with the ratchet wheel.

4 Claims, 1 Drawing Figure

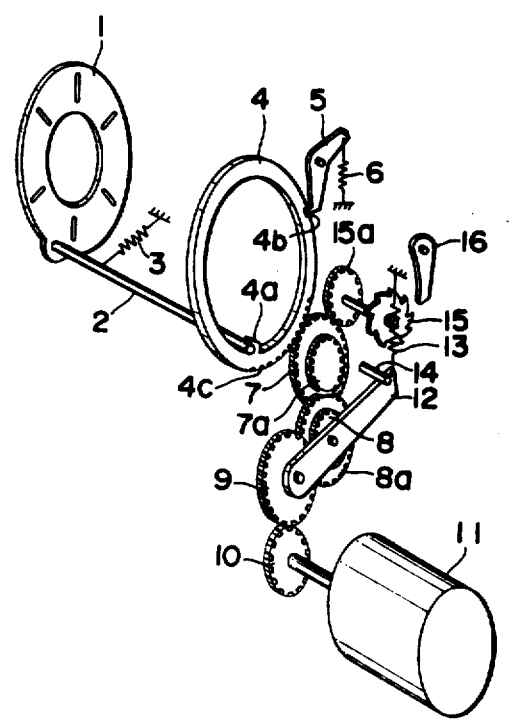

AUTOMATIC APERTURE DRIVING MECHANISM

The present invention relates to an improvement in an automatic aperture driving mechanism of a camera.

A conventional automatic aperture driving mechanism has a control lever disposed in a camera body and adapted to be rotated around an axis which is substantially perpendicular to the optical axis of the photographing lens, an aperture ring disposed at the lens side of the camera, an aperture driving lever operatively connected to the aperture ring and adapted to engage the aperture control ring, the aperture driving lever being rotatable around the optical axis of the lens, so as to regulate the aperture controlling rotation of the aperture ring and to effect the resetting rotation of the same, and a spring adapted to exert a force for actuating the aperture control lever.

In this type of driving mechanism, the efficiency of the power transmission between the aperture control lever and the aperture driving lever is low, because this power transmission involves a certain amount of slip, due to the orthogonal arrangement of the two lever axis. In order to prevent these levers from being disengaged from each other, it is necessary to impractically limit the range or stroke of the movement of these levers, or to adopt a specific form of engagement and mechanism.

In addition, since there is no fixed proportional relationship between the angular displacements of these levers, it is extremely difficult to maintain the precision of the adjustment of aperture value, and the precise control can be achieved at the cost of a highly complicated mechanism.

Further, since it is not allowed to prolong the time of resetting the aperture to the opened state, the spring for resetting the aperture through the aperture control lever has to have a force considerably larger than that of the spring for actuating the aperture drive lever for adjusting the aperture value. Consequently, a large impact is caused when the resetting rotation is stopped, incurring a rapid wear or breakage of the parts concerned.

It is therefore a major object of the invention to overcome above-described problems of the prior art by providing an improved automatic aperture driving mechanism.

To this end, according to the invention, there is provided an automatic aperture driving mechanism comprising an aperture control ring mounted on the camera body and rotatable around the optical axis of the photographing lens, a regulating means adapted to regulate the rotation of the aperture control ring in the closing direction, a reset driving means including a gear train engaging the aperture control ring and a motor connected thereto, and an aperture driving lever operatively connected to the aperture ring disposed at the lens side and adapted to be moved together with the aperture control ring.

The above and other objects, as well as advantageous features of the invention will become more clear from the following description of the preferred embodiments taken in conjunction with the accompanying drawing.

The attached sole FIGURE is a perspective view of an embodiment of the invention.

The FIGURE is a perspective view of an embodiment of the invention, in the state in which the aperture has been opened fully. In this FIGURE, a reference numeral 1 denotes an aperture ring provided with cam grooves for driving the aperture or iris blades. An aperture driving lever 2 is rotatable around the optical axis of the photographing lens, in relation to the rotation of the aperture ring 1. Both of the aperture ring 1 and the aperture driving lever 2 are mounted on the lens side of the camera, and are biased by a spring 3 in the closing direction of the aperture.

Referring now to the camera body side, an aperture control ring 4 is mounted so as to rotate around the optical axis of the lens. The aperture control ring 4 has a projection 4a adapted to prevent the aperture driving lever 2 from being moved by the spring 3, and a dent 4b adapted for engagement with a pawl 5 urging in the clockwise direction by a spring 6. As a result of this engagement of the pawl 5 and the dent 4b, the aperture ring 1 is held at the position for fully opening the aperture, through the medium of the aperture driving lever 2. The aperture control ring 4 further has a toothed peripheral portion 4c. On the other hand, a reset driving means is constituted by a gear train and a motor connected to the gear train. One of the gears of the gear train engages the teeth of the toothed peripheral portion 4c of the aperture control ring 4. More specifically, the gear train of the reset driving means includes a reset driving gear 7 engaging the toothed peripheral portion 4c of the aperture control ring 4, a gear 7a having a non-toothed portion unitary and coaxial with the reset driving gear 7, a gear 8a having a non-toothed portion and engageable with the gear 7a, so as to play, in cooperation with the gear 7a, the role of a clutch for making and breaking the power transmitting connection, a transmission gear 8 unitary and coaxial with the gear 8a, an intermediate gear 9 engaging the transmission gear 8 and a motor gear 10 attached to the shaft of a motor 11 and engaging the intermediate gear 9.

The condition of meshing of the reset driving gear 7 and the toothed peripheral portion 4c of the aperture control ring 4 are so selected that the gear 8a is opposed by the non-toothed portion of the gear 7a, in the fully opened state of the aperture in which the pawl 5 resets in the dent 4b of the aperture control ring 4. At the same time, the meshing condition is such that the gear 7a is opposed also by the non-toothed portion of the gear 8a, when the motor is kept in the stopped state.

In order to avoid the interference of the teeth of both gears 7a, 8a, which may take place because of the presence of the non-toothed portions, the shaft of the gears 8a and 8 is mounted on a lever 12 which is swingable around the axis of the intermediate gear 9. The lever 12 is biased by a spring 13, so as to move the gear 8a closer to the gear 7a. This biasing force is received by a stopper 14 which limits the rotation of the lever 12 so as to preserve the minimum distance between the gears 7a, 8a for the correct meshing of these gears with each other.

Further, in the illustrated embodiment, aperture regulating means is constituted by a regulating gear 15a engaging the reset driving gear 7, a ratchet wheel 15 coaxial and unitary with the gear 15a, and a regulating pawl 16 engaging the ratchet wheel 15.

The aperture driving mechanism of the invention having the described construction is operated in the manner described hereinunder.

As the release button (not shown) of the camera is depressed, the pawl 5 is swung against the force of the spring out of engagement with the dent 4b of the aperture control ring 4, by a known mechanical means. Consequently, the aperture control ring 4 is rotated together with the aperture driving lever 2 and the aperture ring 1, in the closing direction of the aperture, by the force of the spring 3.

The rotation of the aperture control ring 4 in turn causes the rotation of the reset driving gear 7 engaging the toothed peripheral portion 4c of the aperture control ring 4, as well as the rotation of the regulating gear 15a and the regulating ratchet wheel 15 associated with the reset driving gear 7.

Then, the regulating pawl 16 is actuated as an aperture control information (not shown) is given, into engagement with the regulating ratchet wheel 15. As a result, the rotations of the regulating gear 15a, reset driving gear 7, aperture control ring 4, aperture driving lever 2 and the aperture ring 1 are stopped, to regulate and hold the aperture at the opening corresponding to the aperture control information.

During this operation, the rotation of the reset driving gear 7 is not transmitted to the motor side, because the gear 7a has been opposed by the non-toothed portion of the gear 8a. However, when the aperture is set as stated above, the gear 7a has been rotated to bring its toothed portion into engagement with the gear 8a of the motor side.

As the exposure is finished, an exposure completion information (not shown) is issued to release the regulating pawl 16 from the ratchet wheel 15. Simultaneously, the motor is operated to drive the intermediate gear 9 through the motor gear 10. The rotation of the intermediate gear 9 is transmitted to the gear 8a having non-toothed portion, through the transmission gear 8. Then, as the gear 8a is rotated, the toothed portion of the latter is brought into engagement with the toothed portion of the gear 7a, so that the gears 7a and 7 are rotated. Consequently, the aperture control ring 4, the aperture driving lever 2 and the aperture ring 1 are rotated, so as to reset the aperture in the fully opened state, overcoming the force of the spring 3.

At the instant when the resetting of the aperture is finished, the non-toothed portion of the gear 7a is brought to the position to confront the cooperating gear 8a, so that these gears are disengaged from each other. At the same time, the pawl 5 comes to oppose and drop into the dent 4b of the aperture control ring 4, so as to hold the aperture in the fully opened state. Then, the motor is stopped by a known measure when the non-toothed portion of the gear 8a has been brought to oppose to the gear 7a.

As has been described, according to the invention, the aperture ring 1, aperture driving lever 2 and the aperture control ring 4 for controlling the rotation thereof are adapted to rotate around a common axis, i.e. the optical axis of the photographing lens. In addition, the members of the regulating means for regulating the aperture control ring 4, as well as the members of the reset driving means, are adapted to rotate around the axis parallel to the optical axis of the photographing lens. Further, the movable members at the driving side and driven side are moved in most cases in the same direcion. Accordingly, the transmission of the movement or power is made at a high efficiency, and the aforementioned specific forms of engagement of members and complicated mechanisms for limiting the strokes of movements of engaging members are dispensed with, because the good engagements are maintained without limiting the strokes of movements of these members. At the same time, since constant proportional relationships are maintained between the angular displacements of the members, the precision of the aperture control can be obtained with a relatively simple mechanism. Further, thanks to the provision of the gears having non-toothed portions in the gear train of the reset driving means, the transmission of the torque from the motor to the aperture control ring is interrupted at the instant of completion of the resetting when the aperture control ring is stopped, so that no substantial mechanical impact is applied to the aperture control ring even when a motor of a large torque is used in the reset driving means. This ensures a longer life of the automatic aperture driving mechanism.

In the aperture driving mechanism of the invention, the movement of the aperture regulating pawl 16 into and out of engagement with the ratchet wheel 15 can be controlled both electrically and mechanically. For effecting this control electrically, the solenoid coil of a solenoid associated with the regulating pawl 16 is energized and de-energized in accordance with the aperture control information derived from the automatic aperture control device or a preset aperture ring. Also, the mechanical control is effected by directly delivering the mechanical aperture control information to the regulating pawl 16.

At the same time, if the motor 11 incorporated in the automatic aperture driving mechanism of the invention is an electric motor, the start and stop of the motor can be controlled by a combination of an "on" and "off" switch and a solenoid-actuated brake means, while, if the motor 11 is a mechanical motor actuated by a coiled spring, the same control can be effected by means of known measures making use of a stopper pawl and brake.

The described and illustrated embodiment is not exclusive and, therefore, various changes and modifications may be imparted thereto. For instance, such changes of design can easily be made as to make the aperture regulating pawl 16 play also the role of the pawl 5, so that the latter may be omitted, and to allow a direct engagement of the aperture regulating pawl 16 with the control ring 4, so as to eliminate both of the regulating ratchet wheel 15 and the regulating gear 15a.

At the same time, it is possible to avoid the mutual interference of the gear teeth of the gears 7a, 8a by adopting gear teeth having keen or narrowed edges. In such a case, the lever 12 can be dispensed with.

Further, the gears having non-toothed portions can be omitted provided that the motor 11 is an electric motor, the starting and stopping of which can be controlled promptly and precisely, and that no substantial resistance and inertia are applied to the aperture control ring 4 when the latter is rotated and stopped.

What is claimed is:

1. In an automatic aperture driving mechanism for a camera comprising an aperture ring, an aperture driving lever operatively connected to the aperture ring at one side thereof, biasing means for biasing the aperture ring in the closing direction of the aperture, and holding means for holding the aperture ring at the fully opened position of the aperture against the biasing means, the improvement characterized by comprising an aperture control ring operatively connected to one portion of the aperture driving lever and rotatable with the aperture driving lever around substantially the optical axis of the photographing lens, and a reset driving means including a gear train connected to drive the aperture control ring and a motor connected to drive said gear train, said gear train including clutch means operative so that power is not transmitted to the motor when the aperture ring is driven in the closing direction of the aperture by said biasing means during photographing, but so that power is transmitted to the aperture control ring from the motor only when the motor is energized for moving the aperture ring in the opening direction of the aperture after photographing is carried out.

2. An automatic exposure driving mechanism according to claim 1 wherein said aperture control ring includes a toothed portion, wherein said gear train includes a first gear engaged with said toothed portion of said aperture control ring, and wherein said clutch means includes a second gear having a non-toothed portion located in said drive train between said first gear and said motor.

3. An automatic aperture driving mechanism as claimed in claim 1, wherein the gear train comprises a first gear having a non-toothed portion and mounted coaxially on a reset driving gear engaging with the toothed portion of the aperture control ring, a second gear having a non-toothed portion mounted so as to face the first gear, a transmission gear mounted coaxially on the second gear, an intermediate gear engaging with the transmission gear, a motor gear mounted on the output shaft of the motor, and a lever which is swingable around the axis of the intermediate gear, the second gear and the transmission gear being provided on the lever so that the first and second gears are engagable precisely.

4. An automatic aperture driving mechanism as claimed in claim 2 further comprising an aperture regulating means having rotary means which is rotated by power transmitted from the first gear engaging with the aperture control ring and means which is operated by exposure information for stopping the rotary means.

* * * * *